(12) United States Patent
Masuda et al.

(10) Patent No.: US 7,343,090 B2
(45) Date of Patent: Mar. 11, 2008

(54) LENS-FITTED PHOTO FILM UNIT

(75) Inventors: Takeshi Masuda, Minami-Ashigara (JP); Nobuyuki Kameyama, Minami-Ashigara (JP); Hirofumi Katsura, Minami-Ashigara (JP); Kazumi Koike, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 185 days.

(21) Appl. No.: 11/200,095

(22) Filed: Aug. 10, 2005

(65) Prior Publication Data

US 2006/0045496 A1 Mar. 2, 2006

(30) Foreign Application Priority Data

Sep. 1, 2004 (JP) ............................. 2004-254818

(51) Int. Cl.
*G03B 17/02* (2006.01)
*G03B 7/087* (2006.01)
*G03B 9/00* (2006.01)

(52) U.S. Cl. ........................... 396/6; 396/242; 396/458

(58) Field of Classification Search .................... 396/6, 396/155, 166, 242, 458, 563

See application file for complete search history.

(56) References Cited

U.S. PATENT DOCUMENTS 5,543,883 A * 8/1996 Green .......................... 396/563
6,222,995 B1 * 4/2001 Uchida .......................... 396/6

FOREIGN PATENT DOCUMENTS

| JP | 2000-162738 | 6/2000 |
| JP | 2000-275709 | 10/2000 |
| JP | 2001-22035 | 1/2001 |
| JP | 2002-90825 | 3/2002 |

* cited by examiner

*Primary Examiner*—Christopher Mahoney
(74) *Attorney, Agent, or Firm*—Young & Thompson (57) ABSTRACT

A lens-fitted photo film unit is preloaded with a roll of photo film whose film speed is ISO3200, and has a mode selection member that is manually operated to select one of a standard photography mode, an indoor photography mode and a night-view photography mode. In the standard photography mode, an exposure is made without flash with a small aperture size and at a high shutter speed. In the indoor photography mode, an exposure is made with a flashlight, with a middle aperture size and at a high shutter speed. In the night-view photography mode, an exposure is made with a flash light, with a large aperture size and at a low shutter speed.

17 Claims, 9 Drawing Sheets

LENS-FITTED PHOTO FILM UNIT

FIELD OF THE INVENTION

The present invention relates to a lens-fitted photo film unit that is preloaded with a roll of unexposed photo film and has simple photographic mechanisms, and more particularly to a lens-fitted photo film unit with an exposure value switching device.

BACKGROUND ART

Various lens-fitted photo film units preloaded with photo films are on the market. Among such lens-fitted photo film units, those which improve their imaging characteristics by enabling selecting photography modes according to brightness are known. For example "Night & Day" (a trade name) is produced and sold by the present applicant.

The above-mentioned lens-fitted photo film unit is loaded with a high-speed photo film, and is provided with three photography modes: a day-light photography mode (with no flash light) and a day-light synch-flash photography mode (with flash light) to deal with photographing in such a bright place as outdoors in the daytime and a night-view synch-flash photography mode to deal with photographing such a dark subject as a night view or photographing with flash light a main subject like people with a dark background like a night view or a dark inside of a room while reproducing the background at an appropriate density.

To be more precise, a film speed of the photo film is ISO1600. The day-light and day-light synch-flash photography modes set a shutter speed at 1/120 seconds and an aperture size at f/14 in f-number. The night-view synch-flash photography mode sets the shutter speed at 1/45 seconds and the aperture size at f/6.2. According to this, as an exposure value (EV) is based on ISO100, an appropriate exposure value is EV10.8 in the day-light and day-light synch-flash photography modes and EV7.0 in the night synch-flash photography mode.

Using the above-mentioned high-speed photo film allows widening the range of brightness the night-view synch-flash photography mode can deal with while maintaining the usefulness. However in the event that the appropriate exposure value is switched by two stages as described above, it is impossible to fully exploit advantages of using the high-speed photo film. For example, it becomes possible to photograph quite dark scenes by lowering the shutter speed so far as it would not induce shaking and making the aperture size as large as possible for the night-view synch-flash photography mode.

In that case, however, such a brightness range that is beyond capacity of the camera would turn up between a brightness range covered by the night-view synch-flash photography mode and one covered by the day-light and day-light synch-flash photography modes set for photographing outdoors in the daytime. For example a preferable imaging characteristics cannot be gained in a dim inside of a room even in any photography modes. On the contrary, setting the proper exposure value for the night-view synch-flash photography mode closer to one for the day-light and day-light synch-flash photography modes makes it impossible to photograph a darker scene that is to be dealt with by the night-view synch-flash mode while maintaining the usefulness.

SUMMARY OF THE INVENTION

In view of the foregoing, a primary object of the present invention is to provide In view of the foregoing problems, an object of the present invention is to provide a lens-fitted photo film unit that can photograph scenes under a wider range of brightness taking full advantage of using a high-speed photo film.

To achieve the above and other objects, according to the present invention, a lens-fitted photo film unit is loaded with a photo film whose film speed is over ISO1600, and more preferably over ISO3200, and comprises a photography mode selection member for selecting one from among first to third photography modes and an exposure value switching device for switching proper exposure values in accordance with the selected photography mode, wherein the proper exposure values for the first to third photography modes satisfy the following conditions:

$$9 \leq EV_1 \leq 12,\ 6.5 \leq EV_2 < 9,\ 4 \leq EV_3 < 6.5$$

wherein $EV_1$, $EV_2$ and $EV_3$ represent said proper exposure values for said first to third photography modes calculated based on ISO100 respectively.

This enables us to photograph under a wide range of brightness from such a dark scene as a night view to such a bright scene as outdoors during the day, exploiting the characteristics of the high-speed photo film.

According to a preferred embodiment, the exposure value switching device comprises an aperture size switching mechanism and a shutter speed switching mechanism, which switch over the aperture size and the shutter speed in accordance with the photography mode selected by the photography mode selection member.

The shutter speed switching mechanism preferably satisfies the following conditions:

$$\text{1/30 seconds} \geq T_1 \geq \text{1/60 seconds},\ \text{1/100 seconds} \geq T_2$$

wherein $T_1$ and $T_2$ represent the low shutter speed and the high shutter speed respectively.

The aperture size switching mechanism preferably satisfies the following conditions:

$$f/13.0 \leq A_1,\ f/2.8 \leq A_3 \leq f/8.0$$

wherein $A_1$ and $A_3$ represent the small aperture size for said first photography mode and the large aperture size for said third photography mode in terms of f-number.

In a lens-fitted photo film unit that comprises a flash device, the flash device is turned ON or OFF in cooperation with the photography mode selection member, and the flash device has a guide number of 4 (ISO100·m) or less. A main capacitor of the flash device preferably has a capacitance of 40 μF or less.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
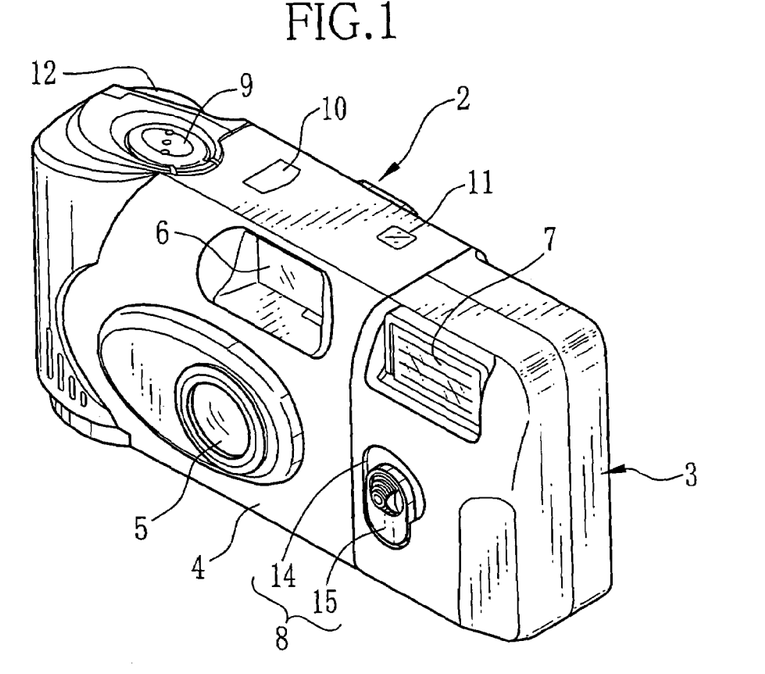
FIG. 1 is an external perspective view of a lens-fitted photo film unit in a standard photography mode according to an embodiment of the present invention.

FIG. 1 shows an external view of a lens-fitted photo film unit according to an embodiment of the present invention. The lens-fitted photo film unit 2 consists of a unit body 3 incorporating various photographic mechanisms, a film cartridge loaded in the unit body 3 in the factory and an attached label 4 wrapping around outer circumference of the unit body 3. The label 4 has apertures to expose some parts of the unit body 3.

The unit body 3 is provided with a taking lens 5, a viewfinder 6, a flash projector 7 and a photography mode selector 8 at the front. The unit body 3 has a shutter button 9, an exposure counter window 10 and a signaling aperture 11 on the top. A part of a film winding wheel 12 exposes from the back of the unit body 3.

The photography mode selector 8 consists of an operation aperture 14 formed at the front of the unit body 3 and an almost oval operation member 15 which is movable within the operation aperture 14. The operation member 15 as a photography mode selecting member moves among a first operational position located lower in the operation aperture 14 shown in FIG. 1, a second operational position slid upward from the first operational position shown in FIG. 2 and a third operational position turned clockwise from the second operational position shown in FIG. 3.

Figure 2:
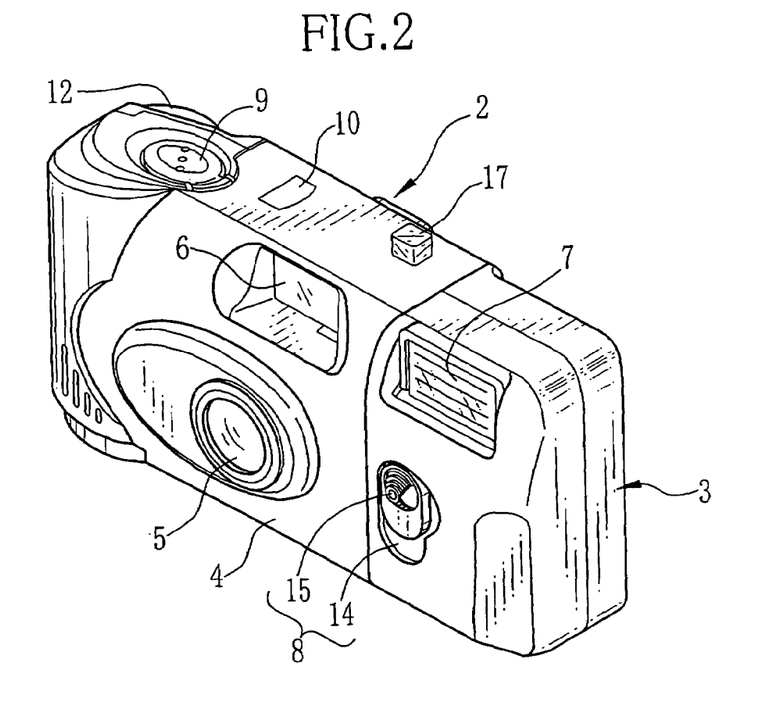
FIG. 2 is an external perspective view of the lens-fitted photo film unit in an indoor photography mode.

When the operation member 15 is in the first operational position, the lens-fitted photo film unit 2 is in a standard photography mode (a first photography mode) with no flash light, a small aperture and a high shutter speed. When the operation member 15 is in the second operational position as shown in FIG. 2, the lens-fitted photo film unit 2 is in an indoor photography mode (a second photography mode) with flash light, a middle aperture and the high shutter speed. In the indoor photography mode, a signaling member 17 is protruded from the top of the lens-fitted photo film unit 2. The signaling member 17 is a light guide that guides light from a light emitting element, which emits on completion of charging a flash lamp, to outside the unit body 3, informing of being ready for photographing.

Figure 3:
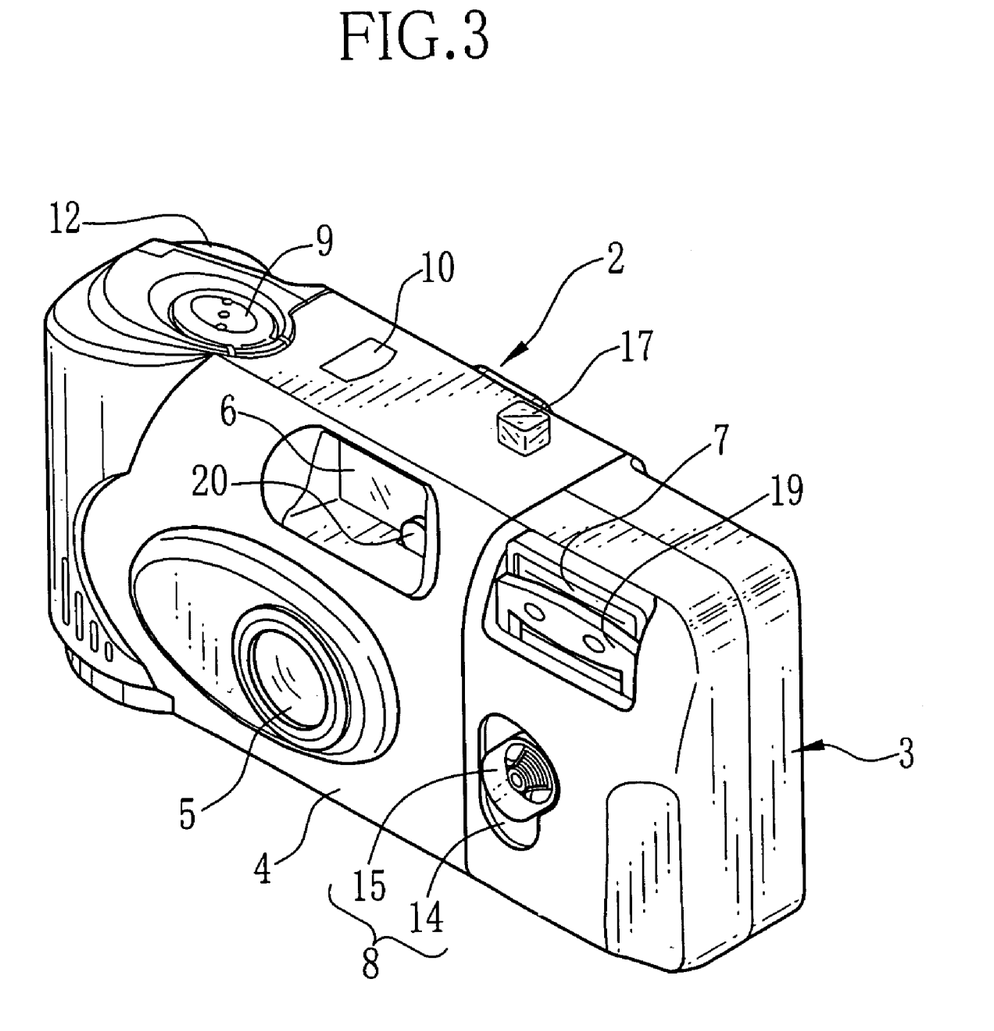
FIG. 3 is an external perspective view of the lens-fitted photo film unit in a night-view photography mode.

When the operation member 15 is in the third operational position as shown in FIG. 3, the lens-fitted photo film unit 2 is in a night-view photography mode (a third photography mode) with the flash, a large aperture and a low shutter speed. In the night-view photography mode, a tabular darkening member 19 is inserted from below to the front of the flash projector 7 so as to reduce the quantity of flash light. A circular index disc 20 is also protruded to the front of the viewfinder 6. To make a visual identification of the index disc 20 in the viewfinder 6 enables a photographer to know that the lens-fitted photo film unit 2 is in the night-view photography mode.

Figure 4:
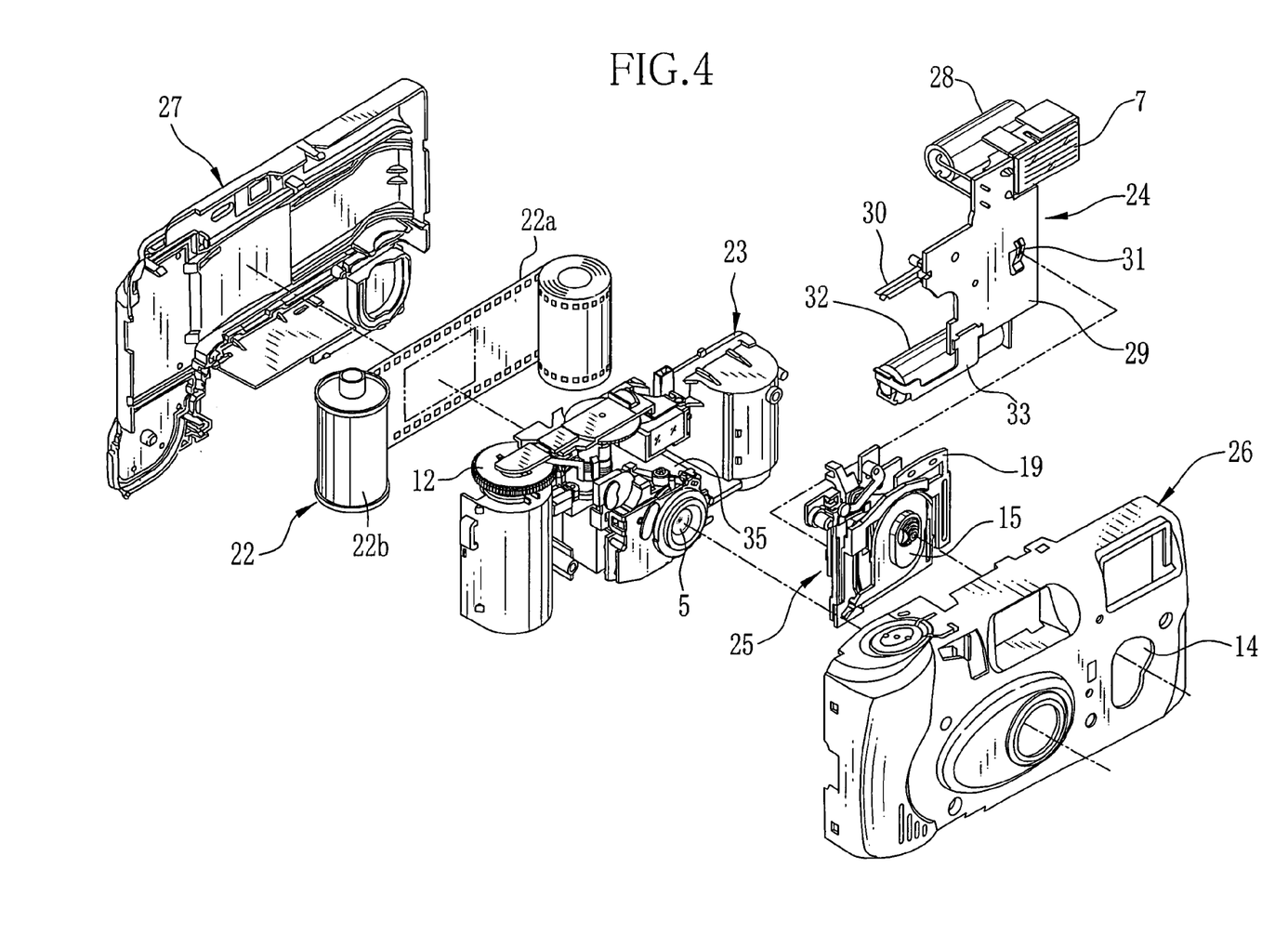
FIG. 4 is an exploded perspective view illustrating the lens-fitted photo film unit.

FIG. 4 is an exploded perspective view illustrating the unit body 3. The unit body 3 consists of a body base 23 where a 135-type film cartridge 22 is loaded, a flash device 24 attached at the front of the body base 23, an interconnection mechanism 25 to switch the photography modes in conjunction with the operation member 15, a front cover 26 and a rear cover 27 set at the front and back of the body base 23.

The film cartridge 22 consists of a photo film 22a and a cartridge shell 22b. As for the photo film 22a, a high-speed film of over ISO1600 is preferable, one of over ISO3200 is more preferable. According to this embodiment, a film speed of the photo film 22a is ISO3200.

The flash device 24 has a printed circuit board 29 which is attached with various electric parts including a main capacitor 28 and forms a flash circuit and the flash projector 7 consisting of a flash discharge tube, a reflector and a diffuser. The printed circuit board 29 is provided with a sync-flash switch 30 which turns on in synchronism with opening and closing of a shutter blade, a metal contact strip 31 constituting a flash charge switch which turns on or off with the move of the operation member 15 in the photography mode selector 8, and a battery contact strip 33 which connects a battery 32, a power source of the flash device 24, with the flash circuit.

Turning on the flash charge switch allows the flash circuit to charge the main capacitor 28 with high voltage. Turning on the sync-flash switch 30 makes the charge stored in the main capacitor 28 discharge through the flash discharge tube, letting the flash discharge tube project the flash light. When the flash charge switch is off, the flash light is not projected because the main capacitor 28 doesn't discharge even if the sync-flash switch 30 is turned on.

As for the flash device 24, the quantity of flash light is set smaller and a guide number is less then 4 (ISO100·m) responding to using the high-speed film as the photo film 22a. According to this embodiment, the guide number is normally 2.8 (ISO100·m) and is reduced to 2.0 (ISO100·m) when the darkening member 19 is inserted to the front of the flash projector 7.

The quantity of flash light is set smaller by use of a smaller capacitance of the main capacitor 28 than conventional, which at the same time offers an advantage in miniaturization. Because the smaller quantity of flash light reduces electric power consumption, a smaller battery than conventional can be used as the battery 32 while maintaining the same battery life as ever before, which is also beneficial to miniaturization. The capacitance of the main capacitor 28 is preferably not more than 40 µF. As the battery 32, the same or smaller size than the AAA-size is preferable and for example an N-size battery is desirable.

At the center front of the body base 23, an image tunnel 35 is provided. Around the image tunnel 35, a shutter charging mechanism, a shutter mechanism, a film winding mechanism, a film winding-lock mechanism, a frame counter mechanism, an imaging optical system, a viewfinder optical system, an exposure value switching device being constituted of an aperture size switching mechanism and a shutter speed switching mechanism are built in.

Figure 5:
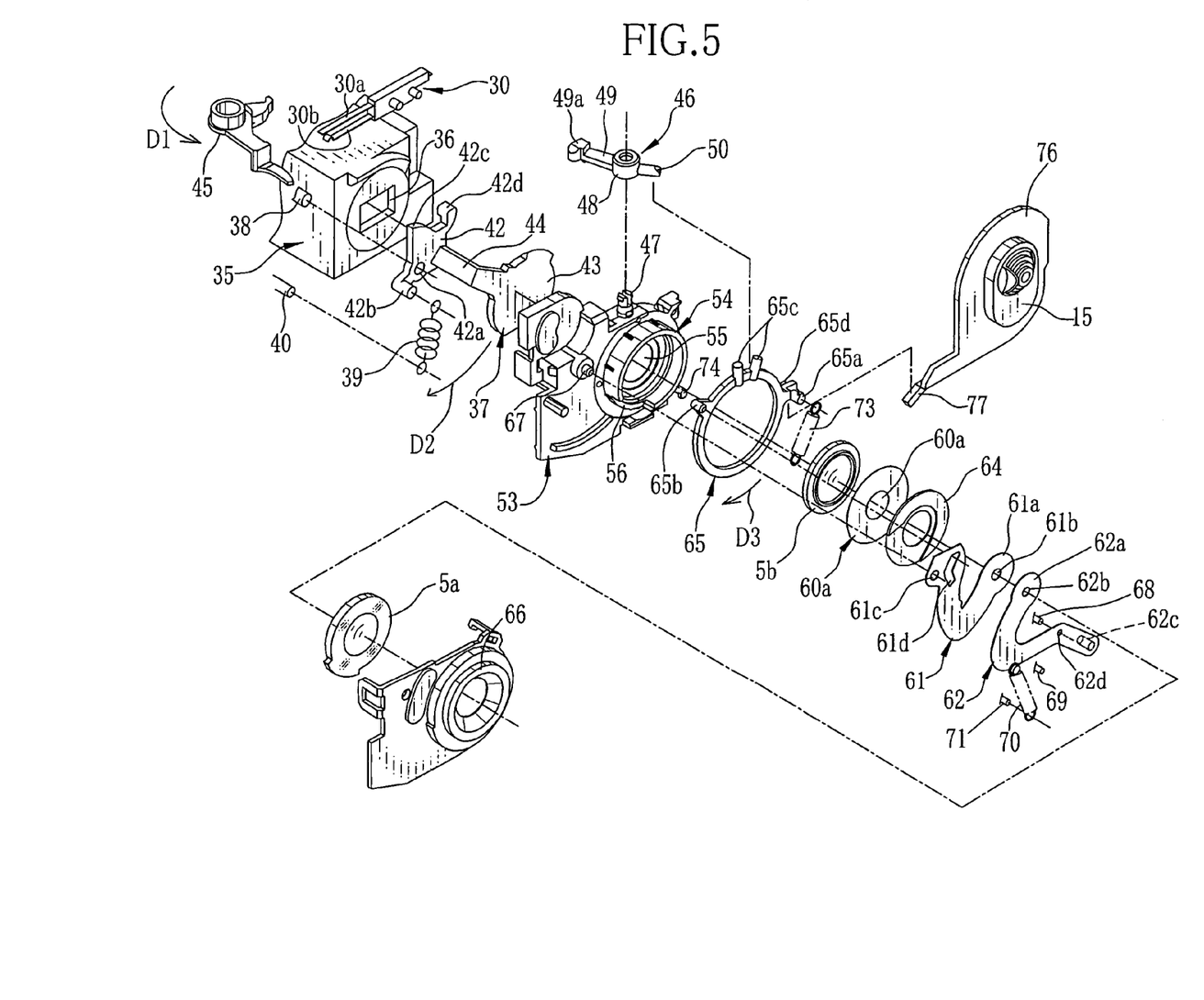
FIG. 5 is an exploded perspective view illustrating an aperture size switching mechanism and a shutter speed switching mechanism.

FIG. 5 is an exploded perspective view illustrating the shutter mechanism, the aperture size switching mechanism, the shutter speed switching mechanism and the imaging optical system built in around the image tunnel 35. At the front of the image tunnel 35, a rectangle picture aperture 36 is formed. At the side, a pin 38 which pivotally holds a shutter blade 37 and another pin 40 on which an end of a spring 39 is hooked are provided.

The shutter blade 37 constituting the shutter mechanism consists of a base section 42 which forms a hole 42*a* for insertion of the pin 38, a blade section 43 which is arranged in front of the picture aperture 36 and opens and closes the picture aperture 36, and a connecting section 44 between the base section 42 and the blade section 43. The base section 42 is provided with a pin 42*b* on which the other end of the spring 39 is hooked, a projection 42*c* kicked by a shutter drive lever 45 and a synchronizing projection 42*d*. The shutter blade 37 is hold in a closing position to cover in the picture aperture 36 with bias of the spring 39.

The shutter drive lever 45, a part of the shutter mechanism, turns in an opposite direction to an arrow D1 in the drawing by the shutter charging mechanism and is set in a charging position. And responding to the shutter release button 9 being pressed, the shutter drive lever 45 turns in a direction of the arrow D1 toward a charge releasing position and kicks the projection 42*c* of the shutter blade 37 during the turn. As being kicked by the shutter drive lever 45, the shutter blade 37 swings in an opposite direction to an arrow D2 in the drawing against the bias of the spring 39, fully opens the picture aperture 36 and then returns to the closing position with the bias of the spring 39. Via the full-open position where the picture aperture 36 fully opens, the shutter blade 37 can swing to a terminal position where it contacts with a stopper pin 53*a* (see FIGS. 8 and 9) provided inside a lens holder 53.

While swinging to the terminal position, the shutter blade 37 presses an upper metal contact strip 30*a* of the sync-flash switch 30 by the synchronizing projection 42*d*, to bring it into contact with a lower metal contact strip 30*b*. The contact of the pair of metal contact strips 30*a* and 30*b* turns on the sync-flash switch 30.

On the top of the lens holder 53, a pin 47 which pivotally holds a stop lever 46 is formed. The stop lever 46 consists of a boss 48 held by the pin 47 and arms 49 and 50 protruded from the side of the boss 48. A top of the arm 49 is provided with a pad 49*a*.

Figure 6:
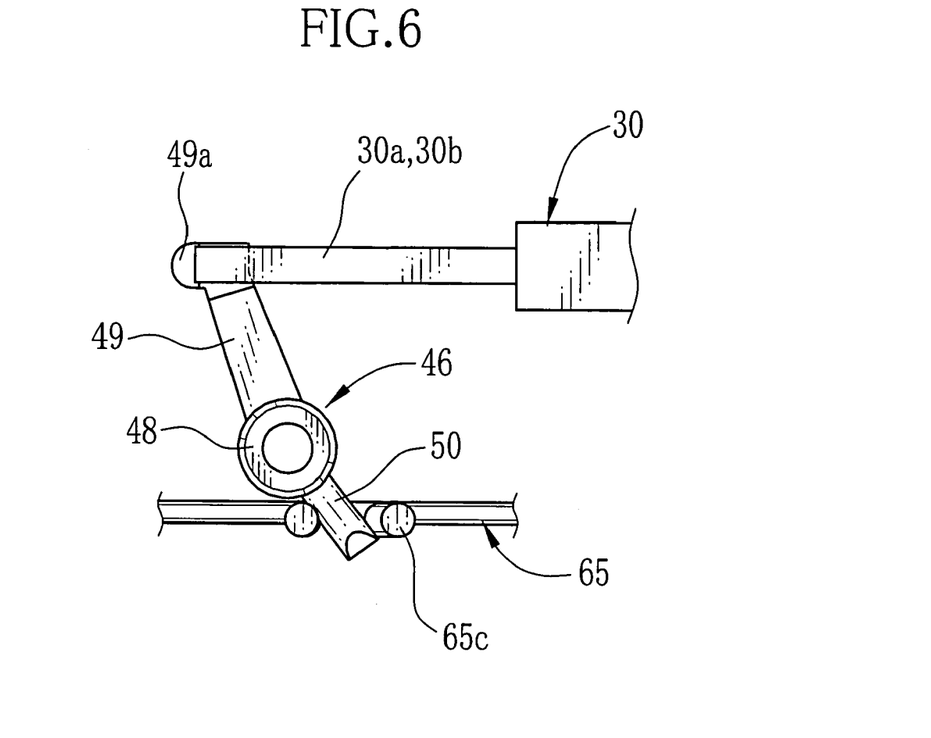
FIG. 6 is an explanatory view illustrating a high shutter speed position of a stop lever.
Figure 7:
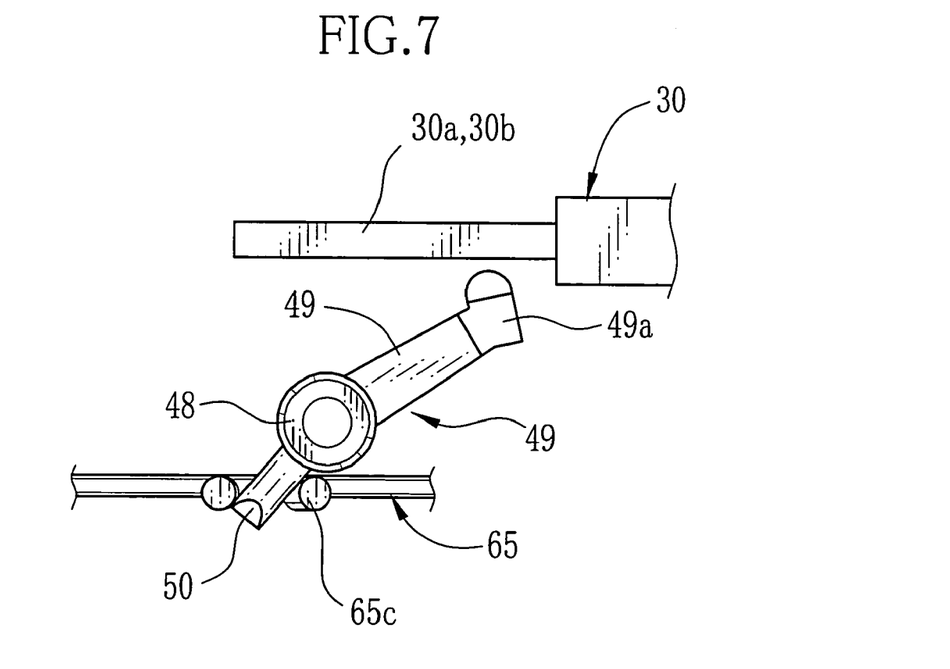
FIG. 7 is an explanatory view illustrating a low shutter speed position of the stop lever.

The stop lever 46 turns between a high shutter speed position where the pad 49*a* is inserted below and touches a free end of the lower metal contact strip 30*b* as shown in FIG. 6, and a low shutter speed position where the pad 49*a* is retreated from below of the lower metal contact strip 30*b* as shown in FIG. 7.

Figure 8:
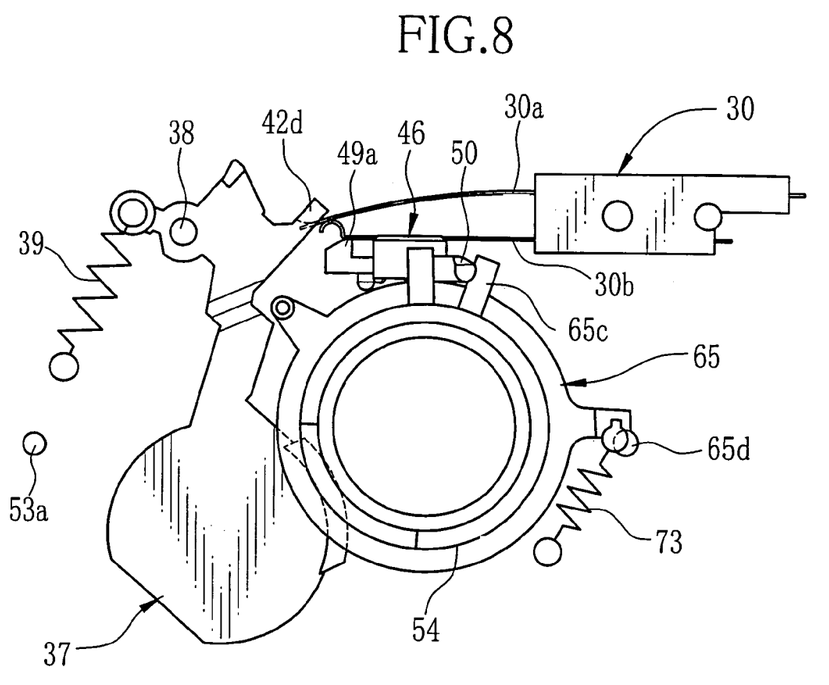
FIG. 8 is an explanatory view illustrating a shutter release operation in the high shutter speed position.

While the stop lever 46 is in the high shutter speed position as shown in FIG. 8, the shutter release lets the flash light be projected because the upper metal contact strip 30*a* is pressed by the synchronizing projection 42*d* of the shutter blade 37, to contact with the lower metal contact strip 30*b* of the sync-flash switch 30. Because the lower metal contact strip 30*b* is in contact with the pad 49*a*, the swing of the shutter blade 37 is stopped at the full-open position on the way to the terminal position. For this reason, the shutter blade 37 returns to the closing position in a short time, which makes it possible to gain a high shutter speed of $\frac{1}{100}$ seconds.

Figure 9:
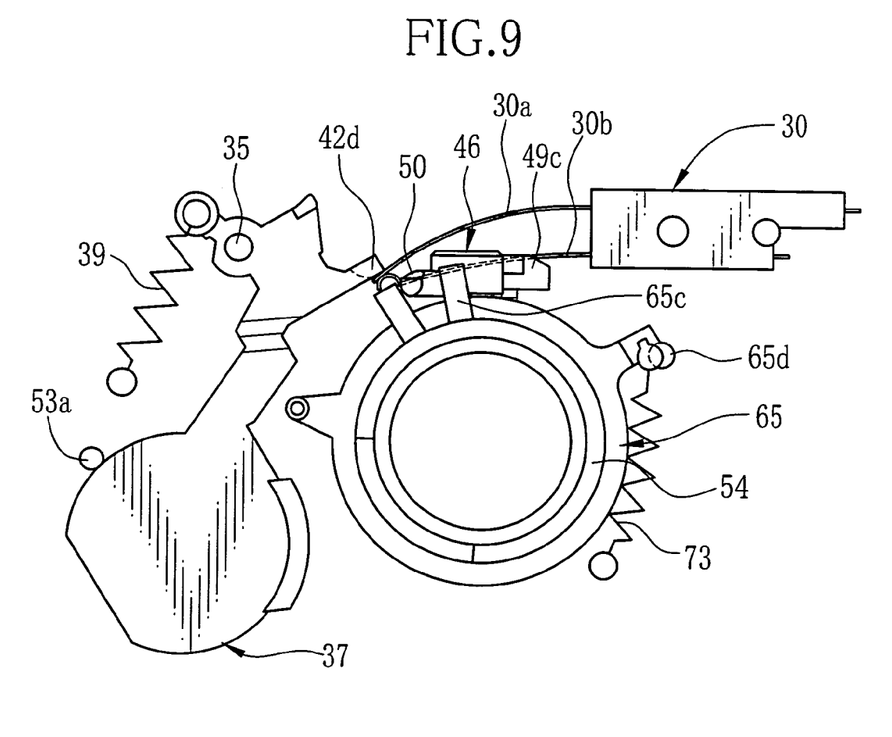
FIG. 9 is an explanatory view illustrating a shutter release operation in the low shutter speed position.

When the stop lever 46 is in the low shutter speed position as shown in FIG. 9, the shutter blade 37 can swing to the terminal position, so it swings through a larger range. It is because the elastic deformation of the lower metal contact strip 30*b* becomes free. As a result, it takes longer for the shutter blade 37 to return to the closing position, providing a lower shutter speed of $\frac{1}{45}$ sec.

As shown in FIG. 5, the lens holder 53 is mounted in front of the image tunnel 35. At the center front of the lens holder 53, a tubular lens barrel 54 is formed. An aperture 55 is formed inside the lens barrel 54, and a notch 56 on the side of the lens barrel 54. A first lens 5*a* and a second lens 5*b* constituting the taking lens 5 are housed in the lens barrel 54. Between the first and second lenses 5*a* and 5*b* are held a large aperture blade 60, a first aperture size switching blade 61, a second aperture size switching blade 62 and a spacer 64 to ensure a space for the insertion of the aperture size switching blades 61 and 62, constituting the aperture size switching mechanism. The large aperture blade 60 is a circular, thin blade and has a large stop aperture 60*a* of a large diameter in the center. An aperture of the spacer 64 is larger than the large stop aperture 60*a* in diameter.

To the front of the lens holder 53 is attached a lens holder plate 66 in order not to have the taking lens 5 and other parts housed in the lens barrel 54 and a switching ring 65 mounted around outer circumference of the lens barrel 54 drop off.

The first aperture size switching blade 61 has a middle aperture section 61*a* at one end to cover the large stop aperture 60*a*, and the middle aperture section 61*a* has a middle stop aperture 61*b* of a smaller diameter than the large stop aperture 60*a*. The first aperture size switching blade 61 also has a hole 61*c* and a crooked slot 61*d* at the other end. The hole 61*c* is pivotally fit on a pin 67 formed near the lens barrel 54 of the lens holder 53. The first aperture size switching blade 61 turns between an inserting position where the middle stop aperture 61*b* is located on an optical axis of the taking lens and a retreating position where the middle aperture section 61*a* retreats from the notch 56 to outside of the lens barrel 54 to expose the large stop aperture 60*a*.

The second aperture size switching blade 62 has a small aperture section 62*a* of the almost same size as the middle aperture section 61*a* at one end. In the middle of the small aperture section 62*a* is formed a small stop aperture 62*b* of a smaller diameter than the middle stop aperture 61*b*. The second aperture size switching blade 62 also has an engaging pin 62*c* at the other end. The second aperture size switching blade 62 is pivotally held as a hole 62*d* of the second aperture size switching blade 62 is fit on a pin 68 formed on the lens holder 53.

Along with the first aperture size switching blade 61, the second aperture size switching blade 62 turns between an inserting position where the small stop aperture 62*b* is located on the optical axis of the taking lens and a retreating position where the small aperture section 62*a* retreats from the notch 56 to outside of the lens barrel 54 and comes into contact with a pin 69 formed on the lens holder 53. A spring 70 makes the second aperture size switching blade 62 biased to the retreating position with one end being hooked on the second aperture size switching blade 62 and the other end on a pin 71 formed on the lens holder 53.

The switching ring 65 is fit on and turns around outer circumference of the lens barrel 54. The switching ring 65 is provided with a pin 65a where an end of a spring 73 is hooked, a link pin 65b which is inserted into the slot 61d of the first aperture size switching blade 61, a pair of nipping pins 65c which nip the other arm 50 of the stop lever 46, and a driven pin 65d protruded to the back side.

The spring 73 biases the switching ring 65 to turn in a direction of an arrow D3 in the drawing, with one end being hooked on a pin 74 formed at a lower front position of the lens holder 53. The switching ring 65 biased by the spring 73 is held in a given position by the first aperture size switching blade 61.

The operation member 15 is integrated with an almost oval switching blade 76 which is integrated with a press lever 77 protruded in a horizontal direction. The engaging pin 62c of the second aperture size switching blade 62 is located on a moving track of the press lever 77 when the operation member 15 slides between the first and second operational positions. And the driven pin 65d of the switching ring 65 is located on the turning track of the press lever 77 when the operation member 15 turns between the second and third operational positions.

Figure 10:
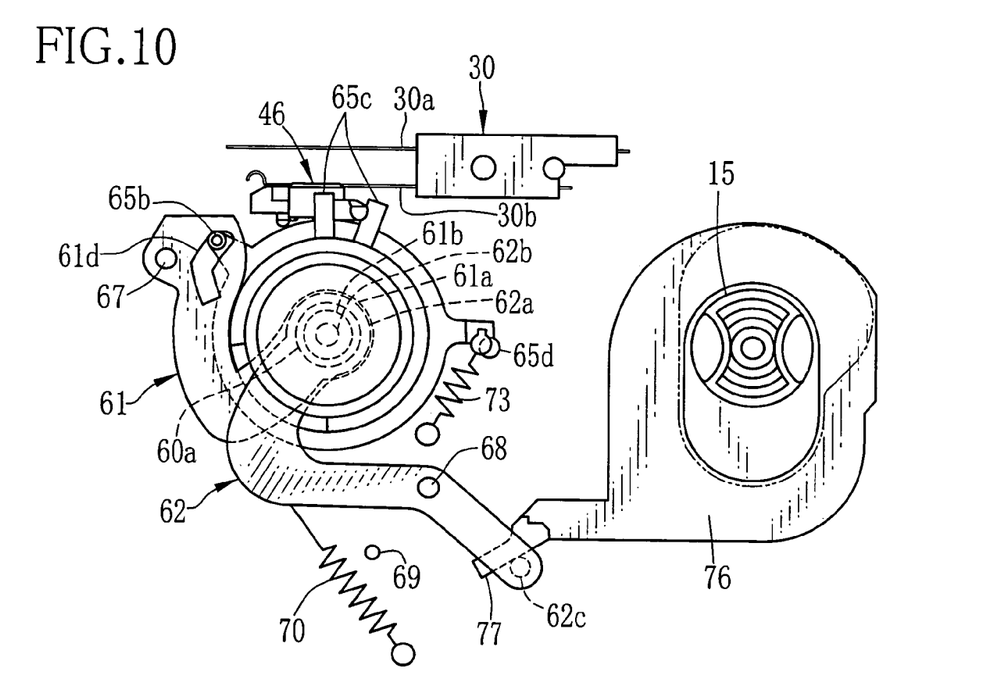
FIG. 10 is an explanatory view illustrating the aperture size and the shutter speed switching mechanisms in the standard photography mode.

FIG. 10 illustrates a state in the standard photography mode. When the operation member 15 is in the first operational position, the press lever 77 is not in contact with the driven pin 65d of the switching ring 65. For this reason, the switching ring 65 is held in an initial position by the first aperture size switching blade 61.

When the switching ring 65 is in the initial position, the pair of nipping pins 65c holds the stop lever 46 in the high shutter speed position. And the first aperture size switching blade 61 is in the inserting position by the link pin 65b where the middle aperture section 61a is inserted into the lens barrel 57. Moreover the second aperture size switching blade 62 biased by the spring 71 is in the inserting position where the small aperture section 62b is inserted into the lens barrel 57 by the engaging pin 62c as it is engaged with the lower portion of the press lever 77. This provides a small aperture state where the quantity of light is limited at the small stop aperture 62c.

Figure 11:
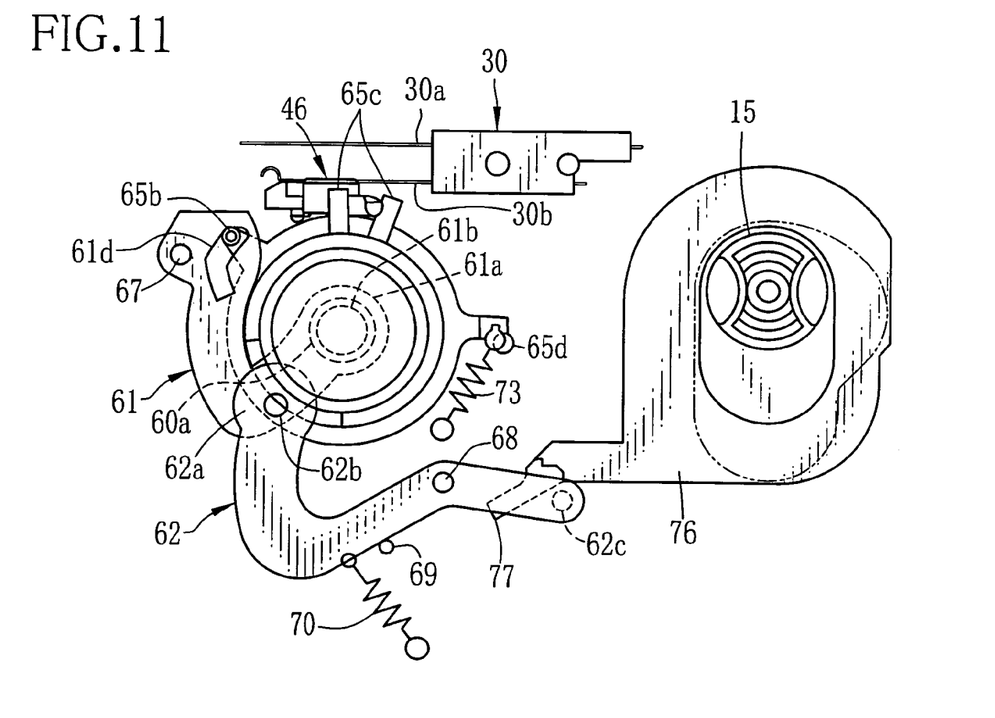
FIG. 11 is an explanatory view illustrating the aperture size and the shutter speed switching mechanisms in the indoor photography mode.

FIG. 11 illustrates a state in the indoor photography mode. When the operation member 15 is in the second operational position, the switching ring 65 is held in the initial position by the first aperture size switching blade 61 because the press lever 77 does not contact the driven pin 65d like as in the first operational position. For this reason, the stop lever 46 is in the high shutter speed position and the first aperture size switching blade 61 is in the inserting position. On the other hand, the second aperture size switching blade 62 turns with the movement of the press lever 77 to the retreating position where it is in contact with the pin 69, biased by the spring 71. This allows the small aperture section 62b to retreat from the lens barrel 54 and makes an aperture state where the quantity of light is limited at the middle stop aperture 61c.

Figure 12:
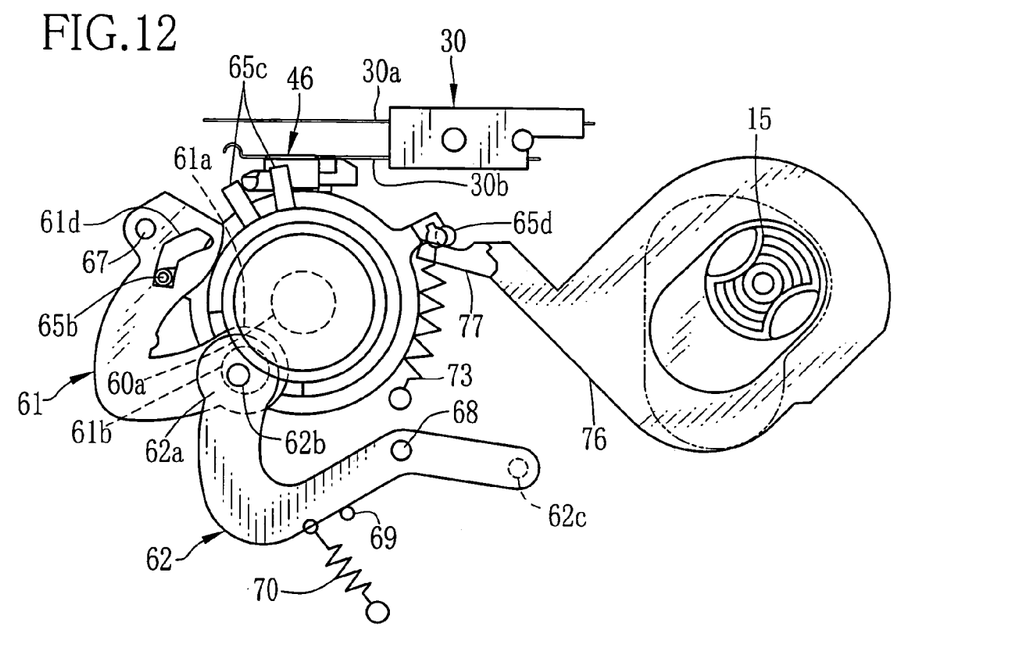
FIG. 12 is an explanatory view illustrating the aperture size and the shutter speed switching mechanisms in the night-view photography mode.

As shown in FIG. 12, in the night-view photography mode, the press lever 77 presses the driven pin 65d from below and turns the switching ring-65 counterclockwise in the drawing when the operation member 15 turns from the second operational position to the third operational position. With the turn of the switching ring 65, the first aperture size switching blade 61 pressed by the link pin 65b turns clockwise in the drawing, which makes a large aperture state where the middle aperture section 61a retreats from the optical axis and the quantity of light is limited at the large stop aperture 60a of the aperture blade 60. And the pair of nipping pin 65c turns the stop lever 46 and sets it in the low shutter speed position.

The signaling member 17, the darkening member 19, the index disc 20 and the metal contact strip 31 constituting a charging switch are interconnected with the operation member 15 by the interconnection mechanism. As the operation member 15 slides between the first and second operational positions, the signaling member 17 moves up and down and the charging switch turns on or off. And as the operation member 15 turns between the second and third operational positions, the index disc 20 and the darkening member 19 are inserted into or retreated from the front of the viewfinder 6 and the flash projector 7, respectively.

The above-mentioned lens-fitted photo film unit 2 uses the photo film 22b whose film speed is ISO3200. In the standard photography mode, the shutter speed is 1/100 sec., an aperture size is f/16 in f-number, and no flash light is projected. And in the indoor photography mode, the shutter speed is 1/100 sec., the aperture size is f/5.6 and a flash light of GN2.8 (ISO100·m) is projected. Moreover in the night-view photography mode, the shutter speed is 1/45 sec., the aperture size is f/4.0 and a flash light of GN2.0 (ISO100·m) is projected.

In the standard photography mode, an appropriate exposure value is EV9.6 as the EV is based on ISO100. In the same way, the appropriate EV is EV6.6 in the indoor photography mode and EV4.5 in the night-view photography mode. With consideration for latitude of the photo film 22b, this enables us to photograph under a wide range of brightness from such a dark scene as a night view to an ordinary photographic scene in the outdoors during the day. It is to be noted that the appropriate exposure value EV on the basis of ISO100 is represented by the following formula: EV=log2 (F2/T)−log2 (S/100) wherein F represents an aperture size, T represents the shutter speed (sec.) and S represents a film speed.

The aperture sizes and the shutter speeds for the respective photography modes are not limited to the above-mentioned combinations insofar as the respective proper exposure values satisfy the following conditions: $9 \leq EV1 \leq 12$, $6.5 \leq EV2 \leq 9$, $4=EV3=6.5$, wherein the proper exposure values for the standard photography mode (the first photography mode), the indoor photography mode (the second photography mode) and the night-view photography mode (the third photography mode) are designated as EV1, EV2 and EV3, respectively. With consideration for shaking and a depth of field, however, it is preferable to use the film speed of over ISO1600, and more preferable over ISO3200 as mentioned above, and set the high shutter speed equal to or higher than 1/100 sec., set the low shutter speed at a value between 1/30 and 1/60 sec., make the small aperture size over f/13 and the large aperture size between f/2.8 and f/8 in f-number.

With ISO3200, the aperture size is f/5.6 and the guide number is 2.8 (ISO100·m) in the indoor photography mode, whereas in the night-view photography mode the aperture size is f/4.0 and the guide number is 2.0 (ISO100·m). In both photography modes, it is possible to photograph a subject at a photographic distance of about 2.8 m at an appropriate exposure amount with the flash light. And with consideration for the latitude of the photo film and allowance of under-exposure of about 1.5 EV, it is also possible to photograph with the flash light a subject within a subject distance of about 5 m in a satisfactory quality level.

Next, the operation of the above-described embodiment will be explained. When photographing in such a bright place as outdoors on a sunny day, the standard photography mode is selected by sliding the operation member 15 down to the first operational position in the operation aperture 14 as shown in FIG. 1.

When the operation member 15 is in the first operational position, the switching ring 65 is in the initial position biased by the spring 73 and the first aperture size switching blade 61 is set in the inserting position as shown in FIG. 10. The second aperture size switching blade 62 is set in the inserting position because the engaging pin 62c engages with the press lever 77. In addition, the stop lever 46 is set in the high shutter speed position as shown in FIG. 6.

Moreover in the standard photography mode, the metal contact strip 31 of the charging switch of the flash device 24 isn't pressed, the signaling member 17 doesn't protrude from an upper face of the unit body 3, and the darkening member 19 and the index disc 20 aren't exposed at the front of the lens-fitted photo film unit 2.

When the shutter button 9 is pressed to photograph in the standard photography mode, the shutter blade 37 starts to turn from the closing position, but the turn is stopped on the way by the stop lever 46 via the sync-flash switch 30. Consequently, the shutter blade 37 returns to the closing position after turning to the full-open position as shown in FIG. 8, so the shutter speed becomes higher. And since the second aperture size switching blade 62 is in the inserting position, the light entering through the taking lens 5 is limited at the stop aperture 62a. Moreover as the charging switch is off, any flash light isn't projected even if the sync-flash switch 30 is turned on. Thus photographs are taken with 1/100 seconds of the shutter speed and f/16 of the aperture size and without flash light.

To photograph a dim place as indoors or people indoors while reproducing a background at appropriate density, the indoor photography mode is selected by sliding the operation member 15 up to the second operational position in the operation aperture 14 as shown in FIG. 2.

When the operation member 15 is in the second operational position, the charging switch turns on and the signaling member 17 protrudes from the upper face of the unit body 3, but the switching ring 65 is in the initial position and the first aperture size switching blade 61 is set in the inserting position. On the other hand, the second aperture size switching blade 62 turns to the retreating position biased by the spring 71 because the press lever 77 engaged with the engaging pin 62c moves upward. Consequently, the light entering through the taking lens 5 is limited by the middle stop aperture 61b of the first aperture size switching blade 61. Thus in the indoor photography mode, photographs are taken with 1/100 seconds of the shutter speed, f/5.6 of the aperture size and flash light with the quantity of 2.8 in guide number.

When photographing such a dark subject as the night view or photographing a main subject like a person with a background of the night view while reproducing the background at appropriate density, the night-view photography mode is selected turning the operation member 15 from the second operational position to the third operational position as shown in FIG. 3.

When the operation member 15 turns to the third operational position, the press lever 77 presses the driven pin 65a from below. For this reason, the switching ring 65 turns from the initial position against the bias of the spring 73. With the turn of the switching ring 65, the first aperture size switching blade 61 turns to the retreating position. The stop lever 46 is set in the low shutter position as shown in FIG. 7.

In conjunction with the turn of the operation member 15 from the second operational position to the third operational position, the darkening member 19 is placed in front of the flash projector 7 and the index disc 20 is placed in front of the viewfinder 6. In addition, the charging switch is kept on and the signaling member 17 is also kept protruded from the upper face of the unit body 3.

When photographing in the night-view photography mode, the shutter opens and closes at the low shutter speed of 1/45 seconds and the flash light is projected in sync with this. The quantity of light is limited at the large stop aperture 60a that is at the aperture size of f/4.0 because the light from the subject entering through the taking lens 5 exposes the photo film through the large stop aperture 60a during the shutter blade 22 opens and closes. The flash light is projected reduced by the darkening member 19 and as a result the quantity of flash light of the guide number 2.0 illuminates the subject.

It is possible to photograph well under the wide range of brightness for example in the bright place as outdoors on the sunny day, in the dim place as indoors, or in the dark place as outdoors at night by selecting respective photography modes as described above. In other words, it is possible to photograph well from a dark scene exploiting the high speed of the photo film 22a to such a bright scene as outdoors on the sunny day.

Now, another embodiment of the present invention will be explained. As described below, this embodiment is the same as the above described embodiment except that it uses two kinds of aperture sizes and a higher shutter speed than that used in the first embodiment, so the explanation will be omitted by applying the same numbers to the same components.

Figure 13:
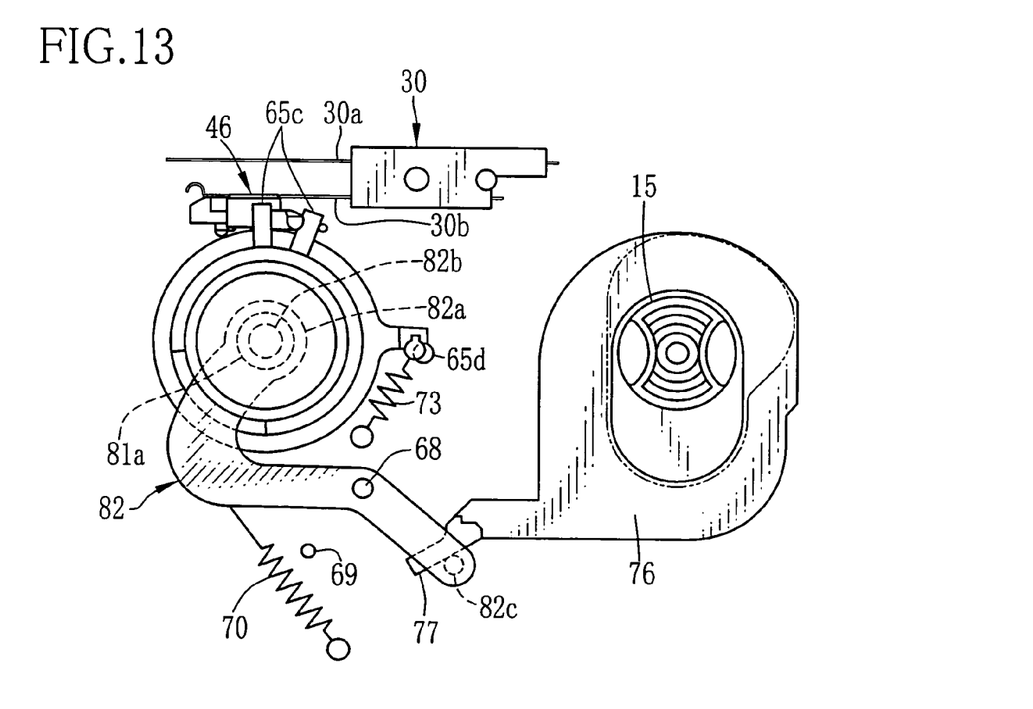
FIG. 13 is an explanatory view illustrating an aperture size switching mechanism and a shutter speed switching mechanism in a standard photography mode, according to a second embodiment with two kinds of aperture sizes.
Figure 14:
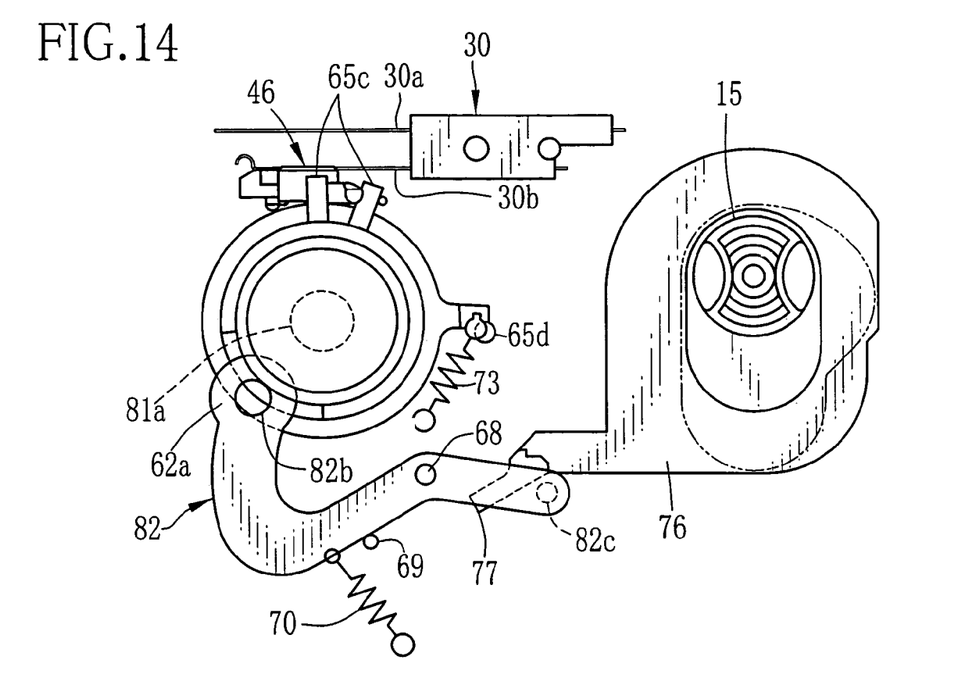
FIG. 14 is an explanatory view illustrating the aperture size and the shutter speed switching mechanisms in an indoor photography mode of the second embodiment.
Figure 15:
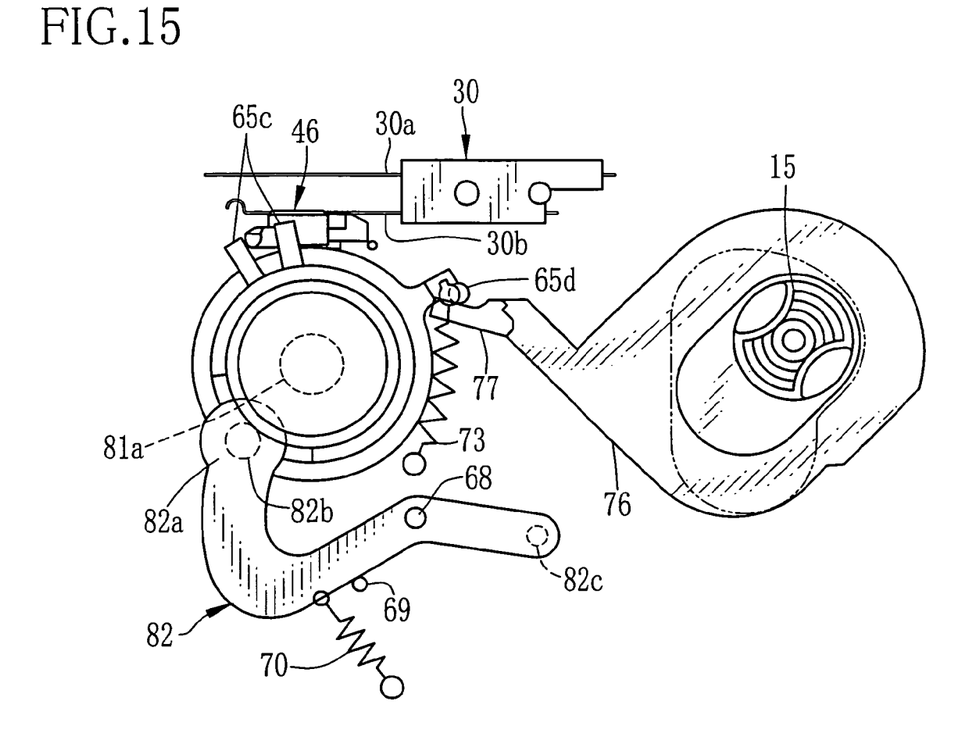
FIG. 15 is an explanatory view illustrating the aperture size and the shutter speed switching mechanisms in a night-view photography mode of the second embodiment.

States of an exposure value switching device in a standard photography mode, an indoor photography mode and a night-view photography mode are shown in FIG. 13, FIG. 14 and FIG. 15, respectively. On an optical axis of a taking lens, a large aperture blade 81 forming a large stop aperture 81a is arranged and the large stop aperture 81a is an aperture size of f/6.2. An aperture size switching blade 82 is provided with a small aperture section 82a whose size is enough to cover the large stop aperture 81a and which has a small stop aperture 82b in the middle. The small stop aperture 82b is an aperture size of f/14.0.

The aperture size switching blade 82 turns with the move of a operation member 15 as shown in FIGS. 13 and 14 between an inserting position where the small stop aperture 82b is placed on the optical axis of the taking lens and a retreating position where the small aperture section 82a retreats outside a lens barrel 54 to expose the large stop aperture 81a. The aperture size switching blade 82 is in the inserting position and in the retreating position when the operation member 15 is in a first operational position and in a second operational position, respectively. A mechanism which turns the aperture size switching blade 82 is the same as one which turns the second aperture size switching blade 62 according to the above described embodiment.

The strength of a spring 39 which biases a shutter blade 37 and position of a stopper 53a to control a rotary angle of the shutter blade 37 are adjusted so as to provide a shutter speed of 1/120 seconds (a high shutter speed) when a stop lever 46 is in a high shutter speed position, and a shutter speed of 1/45 seconds (a low shutter speed) when in a low shutter speed position.

In the same way as the above described embodiment, there is no flash light in a standard photography mode and the flash light is projected in a indoor and a night-view photography modes. In response that the same large aperture (an aperture size of f/6.2) is used both in the indoor and the night-view photography modes, the quantity of flash light is the same. According to this embodiment, a guide number is 3.0 and a darkening member 19 isn't placed in front of a flash projector 7 even in the night-view photography mode. In this case, it is also possible to photograph with the flash light a subject about 2.8 m away under an appropriate exposure amount and even a subject about 5 m away in a satisfactory level.

An above-mentioned lens-fitted 2 uses a photo film whose film speed is ISO3200. In the standard photography mode, the shutter speed is 1/120 sec., an aperture size is f/14.0 and no flash light is used. And in the indoor photography mode, the shutter speed is 1/120 sec., the aperture size is f/6.2 and the flash light of GN3.0 (ISO100·m) is projected. Moreover in the night-view photography mode, the shutter speed is 1/45 sec., the aperture size is f/6.2 and the flash light of GN3.0 (ISO100·m) is projected.

In the standard photography mode, an appropriate exposure value is EV9.5 as the EV is based on ISO100. In the same way, the appropriate exposure value is EV7.2 in the indoor photography mode, and EV5.8 in the night-view photography mode. With consideration for latitude of a photo film 22b, this enables us to photograph under a wide range of brightness from at such a dark scene as a night view to at such a normal scene as outdoors during the day.

In the above described embodiment, photographing with the flash light is in the indoor and the night-view photography modes. It is possible, however, to photograph with no flash light in the standard and indoor photography modes and to photograph with the flash light in the night-view photography mode. It is also possible to photograph with no flash light in the standard and night-view photography modes and to photograph with the flash light in the indoor photography mode.

What is claimed is:

1. A lens-fitted photo film unit loaded with photographic film having a film speed of ISO1600 or more, comprising:
   a photography mode selection member for selecting one from among first to third photography modes; and
   an exposure value switching device for switching proper exposure values in accordance with the selected photography mode, wherein said proper exposure values for said first to third photography modes satisfy the following conditions:

$9 \leq EV1 \leq 12, 6.5 \leq EV2 < 9, 4 \leq EV3 < 6.5$ wherein EV1, EV2 and EV3 represent said proper exposure values for said first to third photography modes calculated based on ISO100 respectively.

2. A lens-fitted photo film unit as claimed in claim. 1, wherein said photographic film has a film speed of ISO3200 or more.

3. A lens-fitted photo film unit as claimed in claim 1, wherein said exposure value switching device comprises an aperture size switching mechanism and a shutter speed switching mechanism, which switch over the aperture size and the shutter speed in accordance with the photography mode selected by said photography mode selection member.

4. A lens-fitted photo film unit as claimed in claim 3, wherein said aperture size switching mechanism switches to a small aperture size in said first photography mode, and to a large aperture size in said second and third photography modes, whereas said shutter speed switching mechanism switches the shutter speed to a high speed in said first and second photography modes, and to a low speed in said third photography mode.

5. A lens-fitted photo film unit as claimed in claim 4, wherein said shutter speed switching mechanism satisfies the following conditions:

1/30 seconds $\geq$ T1 $\geq$ 1/60 seconds, 1/100 seconds $\geq$ T2 wherein T1 and T2 represent the low shutter speed and the high shutter speed respectively.

6. A lens-fitted photo film unit as claimed in claim 4, wherein said aperture size switching mechanism satisfies the following conditions:

f/13.0 $\leq$ A1, f/2.8 $\leq$ A3 $\leq$ f/8.0 wherein A1 and A3 represent the small aperture size for said first photography mode and the large aperture size for said third photography mode in terms of f-number.

7. A lens-fitted photo film unit as claimed in claim 3, wherein said aperture size switching mechanism switches to a small aperture size in said first photography mode, to a middle aperture size in said second photography mode, and to a large aperture size in said third photography mode, whereas said shutter speed switching mechanism switches the shutter speed to a high speed in said first and second photography modes, and to a low speed in said third photography mode.

8. A lens-fitted photo film unit as claimed in claim 7, wherein said shutter speed switching mechanism satisfies the following conditions:

1/30 seconds $\geq$ T1 $\geq$ 1/60 seconds, 1/100 seconds $\leq$ T2 wherein T1 and T2 represent the low shutter speed and the high shutter speed respectively.

9. A lens-fitted photo film unit as claimed in claim 7, wherein said aperture size switching mechanism satisfies the following conditions:

f/13.0 $\leq$ A1, f/2.8 $\leq$ A3 $\leq$ f/8.0 wherein A1 and A3 represent the small aperture size for said first photography mode and the large aperture size for said third photography mode in terms of f-number.

10. A lens-fitted photo film unit as claimed in claim 1, further comprising a flash device that is turned ON or OFF in cooperation with said photography mode selection member.

11. A lens-fitted photo film unit as claimed in claim 10, wherein said flash de&ice is turned OFF in said first photography mode, and is turned ON to emit a flash of light synchronously with each exposure in said second and third photography modes.

12. A lens-fitted photo film unit as claimed in claim 10, wherein said flash device is turned OFF in said first and second photography modes, and is turned ON to emit a flash of light synchronously with each exposure in said third photography mode.

13. A lens-fitted photo film unit as claimed in claim 10, wherein said flash device is turned OFF in said first and third photography modes, and is turned ON to emit a flash of Image Page 8 light synchronously with each exposure in said second photography mode.

14. A lens-fitted photo film unit as claimed in claim 10, wherein said flash device has a guide number of 4 (ISO100·m) or less.

15. A lens-fitted photo film unit as claimed in claim 10, wherein said flash device comprises a main capacitor charged by a power source battery, to let a flash discharge tube emit light by discharging said main capacitor through said flash discharge tube in synchronism with an exposure, wherein said main capacitor has a capacitance of 40 μF or less.

16. A lens-fitted photo film unit as claimed in claim 15, wherein said power source battery has an external size that is equal to or less than that of an AAA-size battery.

17. A lens-fitted photo film unit as claimed in claim 15, wherein said power source battery is an N-size battery.

* * * * *